Feb. 7, 1939. J. E. LEONARD 2,146,634
RECORDING APPARATUS FOR COLOR PHOTOGRAPHY
Filed Jan. 22, 1938
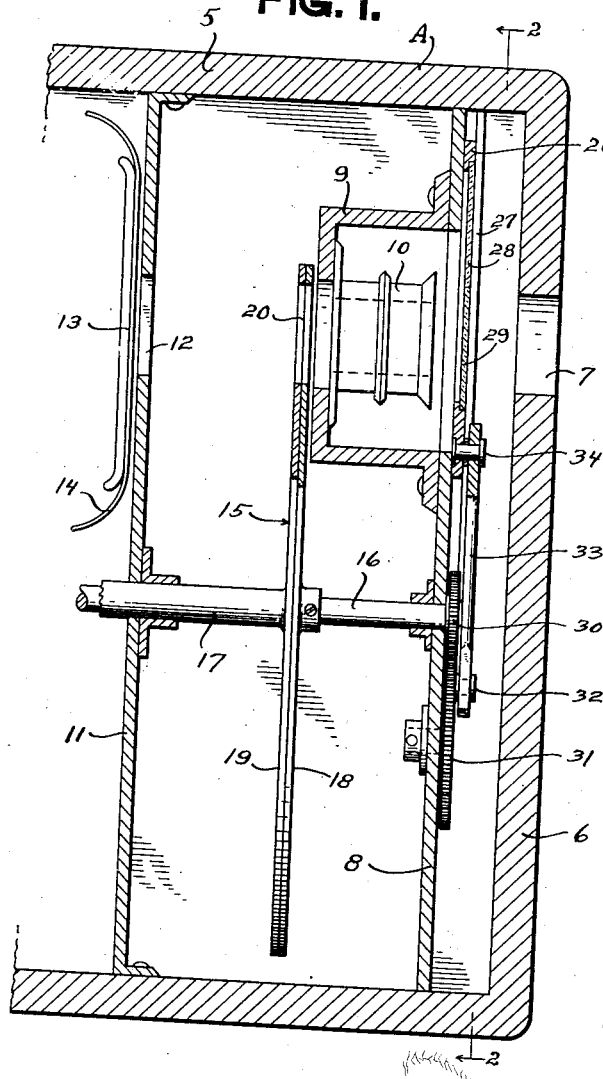
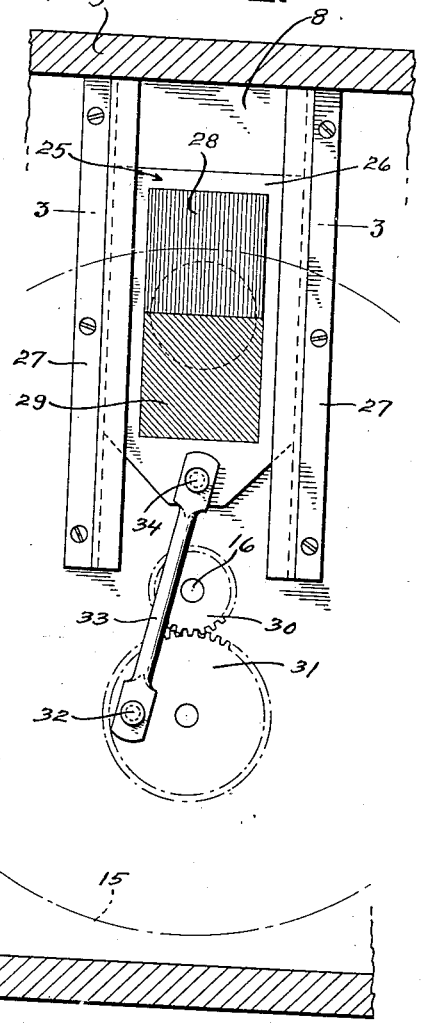
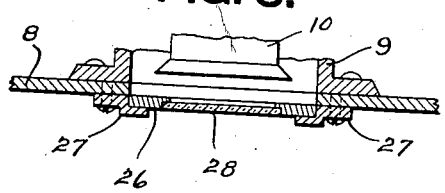
INVENTOR.
John E. Leonard.
BY
ATTORNEYS.

Patented Feb. 7, 1939

2,146,634

UNITED STATES PATENT OFFICE 2,146,634

RECORDING APPARATUS FOR COLOR PHOTOGRAPHY

John E. Leonard, Berwick, Pa.

Application January 22, 1938, Serial No. 186,414

1 Claim. (Cl. 88—16.4)

The present invention relates to apparatus for recording and reproducing motion pictures and relates broadly to cameras for photographically recording pictures in their natural color.

The primary object of the invention is to provide apparatus for obtaining by photography and projection, scenes or images in color thru use of a single linear film strip such as motion picture films; and the present invention relates particularly to apparatus for photographically recording motion picture films upon a single panchromatic film strip for projection in color by means of projection apparatus such as disclosed in my co-pending application Serial Number 186,415 filed under even date with this application. The co-pending projection apparatus referred to, discloses apparatus for reproducing in natural color upon a viewing screen, the pictures which have been photographically recorded upon a linear film by a camera such as disclosed in the present application.

To this end, an object of the present invention is to provide a motion picture camera for photographically recording pictures in sequence on a single panchromatic film strip, with each succeeding picture or frame being taken thru a color filter of different color value or density such as red and green, whereby one frame records the red components of the scene and the next frame the green components of the scene.

A further object of the invention is to provide apparatus for producing motion picture film strips having a series of pictures or frames of different color values alternately recorded in sequence thereon, for projection by the apparatus disclosed in my co-pending application referred to. In the projection apparatus of said co-pending application, the film strip upon which the pictures or frames have been recorded in sequence is advanced one picture area or frame at a time with each frame projected twice, two adjacent frames being projected simultaneously and superimposed upon the screen thru color filter apparatus so associated with the film movement as to have each frame during each of its projection periods, projected thru a color filter of corresponding color value as that associated with the frame during recording of the picture.

A further object of the invention is to provide color filter means which may be readily attached to standard forms of motion picture cameras to adapt the camera for color recording and without requiring any alterations whatever being made to the intermittent film motion mechanism of the camera.

A still further object of the invention is to provide improved apparatus for making color photography thru use of a single linear film strip and without extra cost to the producers.

Other objects and advantages of the invention will be apparent during the course of the following detailed description, taken in connection with the accompanying drawing, forming a part of this specification and in which drawing:—

Figure 1 is a fragmentary vertical section thru a motion picture camera provided with color filter apparatus of this invention.

Fig. 2 is a fragmentary vertical section on the line 2—2 of Figure 1 and showing the filter shuttle at an intermediate position.

Figure 3 is a fragmentary horizontal section on the line 3—3 of Figure 2.

Referring to the drawing in detail and wherein like reference characters designate corresponding parts thruout the several views, the letter A designates a motion picture camera of usual construction comprising a case 5 provided in its front wall 6 with an aperture 7. Mounted in a vertical position in the case 5 in parallel spaced apart relation to the front wall 6 is a lens board or plate 8 provided with a rearwardly projecting lens mounting 9 for supporting a lens 10 in axial alignment with the aperture 7.

Spaced rearwardly from the lens mounting 9 is a vertical partition wall 11 provided with an exposure aperture 12 disposed in alignment with the lens 10. Disposed at the rear of the partition wall 11 is a slide plate 13 between which and the wall 11 the film strip 14 travels with an intermittent movement. The film feeding mechanism may be of any preferred type such for example as shown in U. S. Patent Number 1,973,318 and feeds the film 14 with an intermittent movement past the exposure aperture 12 whereby one picture area or frame of the film is exposed at the aperture at a time. The exposure aperture 12 masks off one frame of the film strip. The intermittent motion mechanism intermittently feeds the film 14 in front of the exposure aperture 12 where the film is momentarily stopped while the shutter 15 is open permitting light rays to pass to the film of the picture being photographed. Thus the film is advanced one frame or picture area at each step so that the pictures are recorded in sequence upon the film.

The rotating shutter mechanism is preferably of the construction disclosed in my U. S. Patent #1,297,703, for shutter dissolve for motion picture cameras. The shutter mechanism includes a rotating shutter shaft 16 encircled by a rotating sleeve 17, the shaft 16 and the sleeve 17 respectively carrying shutter discs 18 and 19 which are relatively movable to vary the size of the shutter aperture 20 all as clearly set forth in my patent above referred to. The shutter 15 has its circumferential portion movable between the lens 10 and the exposure aperture 12 whereby passage of light rays to the film is controlled in timed relation to the film movement as in usual practice.

Referring now to the color filter apparatus, the same operates in timed relation to the film movement whereby a series of images or frames of different color value are alternately recorded in sequence upon the film. Mounted for vertical guided movement upon the forward side of the lens board 8 is a filter shuttle 25 embodying a rectangular-shaped frame 26 having an opening which is vertically elongated as shown in Figure 2. Carried by the lens board 8 are vertical guides 27 which receive the vertical edges of the frame 26 for guiding the frame in a vertical position past the lens 10. Mounted in the frame 26 are color filters 28 and 29 of different color values and in the example shown, the upper color filter 28 is red while the lower color filter 29 is green. These color filters 28 and 29 may be of glass, celluloid or any other suitable material designed for filtering out certain light rays.

A means is provided for imparting a reciprocatory movement to the filter shuttle 25 whereby the color filters 28 and 29 are alternately aligned with the lens 10 in timed relation to the film travel or exposure period of the camera.

The means for actuating the shuttle 25 is driven from the shutter shaft 16. The forward end of the shaft 16 extends thru the lens board 8 and has mounted thereon a small pinion or gear 30 which meshes with a larger crank gear 31, suitably journaled upon the lens board 8. The gears 30 and 31 are mounted in vertical alignment below the shuttle 25 and the gear 31 is provided with a crank pin 32 to which is connected one end of a pitman or connecting rod 33 having its upper end connected to the lower end of the shuttle frame 26 by the wrist pin 34. Thus, upon rotation of the gear 31, the shuttle 25 will reciprocate vertically and alternately align the color filters 28 and 29 with the lens 10.

The speed ratio between the gears 30 and 31 is two to one so that for each revolution of the gear 30, the gear 31 will revolve for one-half revolution. Since the gear 30 is rotated with the shaft 16 and at the speed of the shutter 15, the shuttle 25 will be moved in one direction at one complete revolution of the shutter 15 and in the opposite direction at the next full revolution of the shutter. Since the film 14 is advanced one frame at a time in timed relation to rotation of the shutter 15, the shuttle 25 will be caused to alternate the color filters 28 and 29 so that one picture is photographed thru a red filter and the next thru a green filter. Thus, the pictures are taken in sequence on the film and the frames are alternately subjected to color filters of different color value.

By the specific relation of the crank gear 31 to the line of travel of the filter shuttle 25, it will be seen that when the shuttle is at either of its limits of travel disposing one or the other of the color filters 28 or 29 at the lens 10, that the crank pin 32 will be in one of its dead center positions and that the shuttle is held substantially in one position, or with a very slight movement being imparted thereto while the film is being exposed thru alignment of the shutter aperture 20 with the lens 10. Therefore, while the shuttle 25 is moving for reversing the color filters, the film is moving and light rays are closed off by a solid portion of the shutter 15.

With the improved color apparatus so associated with the camera, and thru use of a single panchromatic film strip, a means for obtaining color films is provided wherein pictures having different color values are alternately recorded in sequence, one frame recording the red components of the scene and the next frame the green components of the scene.

By this alternate recording thru different filters, examination of the negative film shows that alternate pictures vary in density for the same objects photographed thru different color filters. After the series of pictures have been taken upon the single panchromatic film, the negative is handled in the same manner that the ordinary black and white film is handled and the positive film is made on regular positive stock and may be projected in the ordinary manner if no color effects are desired. However, when the true natural colors of the pictures are desired, projection apparatus such as disclosed in my co-pending application referred to may be employed. In said co-pending application, projection apparatus is shown disclosing one manner in which color values can be projected from a black and white film, after the negative film has been taken by use of apparatus such as shown in the present application. In such projection apparatus, an aperture the size of two frames of film must be used on the projector so that two frames will be projected at the same time, one frame having been photographed thru a green filter and the next frame thru a red filter. Means for merging or superimposing these two frames on the screen must also be made possible, and the frames projected thru color filters corresponding to the color values of the filters used in photographing the particular frames.

From the foregoing it will be seen that novel and improved apparatus for photographically recording pictures in their natural color has been provided wherein the pictures are taken in sequence with each succeeding picture being taken alternately thru a color filter of different color value. The arrangement shown discloses means whereby thru use of a single film strip and the color filter apparatus wherein the upper color filter 28 is in the line of light rays passing to the film during one exposure period and the lower filter is in the line of light rays passing to the film during the next exposure period, pictures having different color values are alternately printed in sequence on the single film.

Changes in details may be made to the form of the invention herein shown and described without departing from the spirit of the invention or the scope of the following claim.

I claim:

In a motion picture camera including a lens board, a lens mounted in the upper portion of the board, and a continuously rotated shutter shaft in parallel alignment below the lens; color filter means including vertical guides mounted on the lens board at opposite sides of the lens, a shuttle vertically movable in the guides past the lens, a pair of color filters carried by the shuttle for alternate alignment with the lens, a pinion on the forward end of the shutter shaft, a crank gear meshing with the pinion, and a pitman connecting the gear and shuttle, said gear being rotated by the pinion at one half the speed of the latter.

JOHN E. LEONARD.